United States Patent

[11] 3,608,053

[72] Inventor Armand J. Agostinelli
East Haven, Conn.
[21] Appl. No. 872,659
[22] Filed Oct. 30, 1969
[45] Patented Sept. 21, 1971
[73] Assignee Dart Industries, Inc.
Los Angeles, Calif.
Continuation-in-part of application Ser. No. 720,853, Apr. 12, 1968, now abandoned.

[54] CURED LATEX ARTICLE AND METHOD OF MAKING SAME
7 Claims, 3 Drawing Figs.
[52] U.S. Cl..................................................... 264/306,
2/168, 264/307
[51] Int. Cl..................................................... B29h 3/04
[50] Field of Search........................................ 264/307,
306; 2/168

[56] References Cited
UNITED STATES PATENTS
2,548,974  4/1951  Hansen........................ 264/306
3,286,011  11/1966  Kavalir et al................. 264/307

Primary Examiner—Robert F. White
Assistant Examiner—J. R. Hall
Attorneys—Leigh B. Taylor, Paul R. Wylie and Harold R. Beck ABSTRACT: A method for making rubber latex articles such as surgeon's gloves which are hyperallergenic and which permit improved epidermal perception through the article. The method comprises curing the inside and outside surfaces of a coagulated latex film by contacting the surfaces with sulfur monochloride until the film is cured sufficiently so the film will recover its original shape when the film is stretched and released.

PATENTED SEP 21 1971 3,608,053
FIG.3
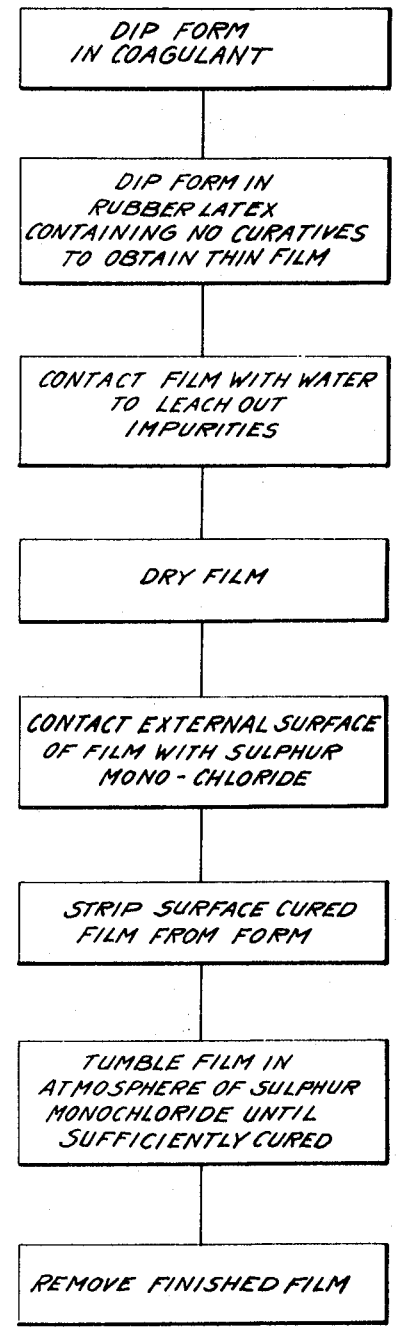
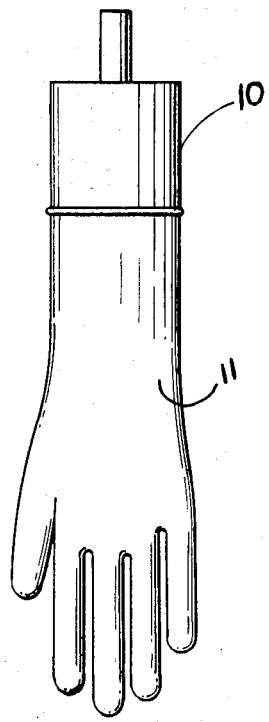
FIG.1
FIG.2
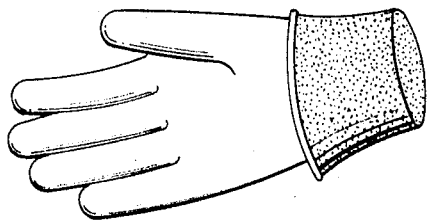
INVENTOR.
ARMOND J. AGOSTINELLI
BY Leigh B Taylor
ATTORNEY

CURED LATEX ARTICLE AND METHOD OF MAKING SAME

This is a continuation-in-part of copending application Ser. No. 720,853 filed Apr. 12, 1968 now abandoned.

This invention relates generally to a method for making a rubber latex article. The invention is more specifically directed to the manufacture of a novel rubber latex surgeon glove using the inventive method.

A glove for covering the hand of a surgeon is necessary to prevent infection of the patient. One the better gloves made in the prior art was manufactured by dissolving milled rubber in a petroleum distillate solvent. A hand-shaped form was then dipped into the rubber solution. The solvent was then permitted to evaporate leaving a thin deposit of rubber on the hand-shaped form. It was then necessary to again dip the form into the rubber solution and to again permit the solvent to evaporate so that more rubber would be deposited on the form. It was frequently necessary to dip the hand-shaped form and permit the solvent to evaporate as many as seven or more times until a sufficient rubber deposit was made on the form. The process of forming the glove was time consuming, required a petroleum solvent and required initial milling of the rubber which adversely effected the strength of the rubber article. The rubber article was then cured which was frequently accomplished by exposing the article to sulfur monochloride.

The method of curing rubber articles with sulfur monochloride originated because it was difficult in the prior art to incorporate curing agents directly into the rubber. The sulfur monochloride curing process was however considered unsatisfactory in that it was difficult to control the vapor concentration and therefore difficult to control the amount of curing of the article. When the rubber solution method of manufacturing rubber articles appeared, the sulfur chloride curing process was generally continued; however, the process began to be replaced by incorporating curing agents directly into the rubber solution.

A further advance, in the manufacture of articles made from thin films of rubber, was made when rubber latex replaced the use of rubber solutions. Articles of rubber film were easily made using latex systems because it was necessary to dip the form only once into the latex to obtain the necessary quantity of rubber on the form. No explosive solvents were used and water was used as the carrier for the colloidal rubber in the latex system. No mastication or milling of the rubber was necessary when the latex system was used, therefore, the rubber article had greater strength. It was easier to mix curing agents directly into the latex system and in addition less time was needed to manufacture the article. The manufacture of the latex article was also substantially less expensive.

Since vulcanizing and curing agents could be easily incorporated into the latex system the sulfur chloride method of curing rubber was completely avoided when latex was used. Because of the above advantages, articles made from latex film replaced substantially all of the film-type articles formed from rubber solution. For example, surgeon's gloves which were formerly formed from rubber solution have been almost completely replaced with latex surgeon's gloves.

Notwithstanding the low cost of manufacturing the later glove, many surgeons prefer the much more expensive glove formed from rubber solution. The surgeons who continue to use the glove formed from rubber solution, which is known in the trade as the "brown milled" glove, claim that they are better able to feel through the glove and that the glove does not cause an allergenic reaction. It is known that the hands of some surgeons become sensitive when they use the latex-type glove. In addition, latex-type gloves frequently have a somewhat undesirable surface tackiness.

Accordingly, it is an object of this invention to provide an article such as a surgeon's glove which is hyperallergenic and which permits improved epidermal perception.

It is a further object of this invention to provide a latex film article which is substantially free from surface tack.

Another object of this invention is to provide an inventive method for manufacturing a novel surgeon's glove which has the advantages of both the latex and "brown milled" type surgeon's gloves.

The invention contemplates a method of making a rubber latex article by the steps of contacting a form for the article with a rubber latex fluid thus forming a film of latex rubber which may be natural rubber latex, on the form, removing water from the film and then curing the film by contacting both surfaces of the film with sulfur monochloride under conditions which will cause vulcanization. Of particular importance is the fact that the rubber latex fluid from which the initial film is formed does not contain the usual compounding curing agents.

The invention also contemplates a novel natural rubber latex surgeon's glove that has advantageous properties imparted thereto by the foregoing method of manufacture.

It also may be desirable to leach the film after the initial film-forming step to remove water soluble impurities therefrom.

The article formed in accordance with the above process will be hyperallergenic and will permit improved epidermal perception. Satisfactory control of curing can be obtained by contacting the formed film with an external vulcanizing agent. Since there are no internal vulcanizing agents which can be activated inadvertently by exposure to higher temperatures, the cure of the natural rubber latex articles formed according to this invention can be controlled by the length of time the article is in contact with the external vulcanizing atmosphere. Vulcanization can be stopped almost immediately upon removing the natural rubber latex article from the vulcanizing atmosphere, whether it be a vapor contact or dipping in a sulfur monochloride containing solution.

FIG. 1 is a view of a natural rubber latex film as deposited on a hand-shaped form in the initial dipping operation;

FIG. 2 illustrates a finished surgeon's glove made according to the invention and shown in a cuffed position; and FIG. 3 is a flow diagram illustrating the various steps of a preferred method for making surgeon's gloves according to the invention.

Referring now to the drawing, a surgeon's glove is formed according to the inventive method by first dipping a form 10 which is shaped as a hand in a suitable coagulant for natural rubber latex. A solution of calcium nitrate is preferred as a coagulant. However, other coagulants that are well known in the art can be used, including other polyvalent metal salts. The form coated with the coagulant is then dipped into a natural rubber latex fluid. The latex fluid can contain constituents which are commonly compounded with rubber including pigments, reinforcing agents and the like. However, it has been discovered in accordance with this invention that it is the compounded curing agents which seem to cause the allergenic reactions. In the case of surgeon's gloves, it is preferred to have only a suitable antioxidant present in an amount sufficient to inhibit autocatalytic oxidation. Such antioxidant will be typically a secondary aromatic amine such as phenol-b-napthyl amine. Inasmuch as the gloves fabricated according to the inventive method do not require a compounded curing or vulcanizing agent, the natural rubber latex fluid will be free of vulcanizing constituents which are the ingredients believed to be responsible for allergenic reactions.

After removal from the dipping operation, form 10 will have a relatively thin layer of uncured natural latex rubber formed as a film 11 thereon. The dipping time is controlled so that a single dip will deposit a film that will form a cured glove having a preferred thickness of from about 0.004 to about 0.012 inches. The film, while still on the form, is leached to remove water soluble impurities therefrom. The leaching operation can be accomplished by either water spray or immersion in water. The film is then air-dried to remove the water so that a reaction will not occur between water and the sulfur monochloride which comes in contact with the glove during the curing step.

In the first curing step, the glove on the form is placed in a curing oven at an elevated temperature sufficient to heat the forms and gloves to that temperature. Sulfur monochloride is then introduced into the oven. The sulfur monochloride vaporizes at the elevated temperature producing a vulcanizing atmosphere around the glove. The gloves are kept in the vulcanizing atmosphere until they are sufficiently cured to permit the gloves to be removed from the form. The gloves are then rotated in an atmosphere of sulfur monochloride until an optimum cure is reached. When the gloves are properly cured they will not crack when stretched (which would indicate overcuring) and the gloves will offer resistance to stretching and demonstrate complete recovery when stretched and released (the absence of which would indicate undercuring). The oven is then exhausted and fresh air is introduced to stop the curing cycle.

Variations in the curing temperature and exposure time combination can be used. Once the cure time for any combination of sulfur monochloride concentration and temperatures which will result in an adequately cured glove in an oven is determined, the glove can be controllably cured simply by controlling the time that the glove remains in the vulcanizing atmosphere.

An article such as a glove manufactured in accordance with the above method will not cause skin sensitivity, that is, the article is hyperallergenic. The article will permit better epidermal perception through the film than was possible through a prior art latex glove having a comparable thickness. The method of manufacture has most of the advantages of the latex system. Only one dip into the latex is necessary, no solvent is necessary and there is no reduction of strength due to milling or mastication. A rubber latex surgeon's glove manufactured by the novel process herein disclosed has the advantages of the "brown milled" and prior art latex gloves.

While not wishing to be bound by any particular theory, it is believed that the improved epidermal perception in the latex article is due to a surface cure which hardens the surfaces but leaves an uncured or slightly cured area between the surfaces. It is believed that the hyperallergenic character is caused by the absence of curing or volcanizing agents which were present in the prior art latex film.

The following specific example illustrates the invention and shows specific conditions which can be used within the scope thereof to form a surgeon's glove.

SPECIFIC EXAMPLE

A number of surgeon's gloves are prepared by dipping hand-shaped forms in a natural rubber latex mixture containing only latex and phenol-b-napthyl amine.

The forms are first dipped in a calcium nitrate coagulating solution and then dipped in the latex fluid for a time sufficient to deposit a film of about 0.008 inch on the form. The form with the film is then dipped in water to leach out water-soluble impurities. The film is then dried on the forms in a drying oven to remove the water. The forms, with the film still intact, is then introduced into a curing oven of approximately 100 cubic feet volume and preheated to a temperature of about 130° F. to about 140° F. for approximately 30 minutes. Two and one-half ounces (avoirdupois) of sulfur monochloride is introduced on a ceramic surface in the oven. The gloves are permitted to remain in the resulting sulfur monochloride atmosphere in the oven at a temperature of about 130° F. to about 140° F. for a period of about 30 minutes.

At the end of the 30 minute period, the oven is exhausted for 5 minutes and the gloves are removed. The gloves are then stripped from the forms with the inside out.

The gloves are then introduced into a tumbler and tumbled for 15 minutes at a temperature of from about 130° F. to about 140° F. in an atmosphere having a sulfur monochloride concentration about the same as the concentration used in the first curing step.

Any excess sulfur monochloride is removed from the gloves by tumbling them in air for about 10 minutes and then briefly tumbling the gloves in an atmosphere containing ammonia gas.

What is claimed is:

1. A method of making a hyperallergenic article having interior and exterior surfaces and having improved epidermal perception from latex rubber, comprising:
   a. coating a form for said article with a coagulant solution for said latex,
   b. dipping said coated form into a rubber latex fluid free from curing agent therein, to form a coagulant film of said latex upon said form,
   c. drying said film to remove water,
   d. curing the exterior surface of said film within an atmosphere of sulfur monochloride vapor at an elevated temperature until the exterior surface of said film has been cured enough so that the exterior surface will recover its original shape after the film has been stretched and released, and stopping said curing before the exterior surface cracks when said film is stretched,
   e. stripping from said form said film with the inside out, and
   f. curing said film in an atmosphere of sulfur monochloride vapor at an elevated temperature until both surfaces of said film will recover their original shape after the film has been stretched and released, and stopping said curing before either surface will crack when the film is stretched.

2. The method of claim 1 wherein the article is a surgeon's glove.

3. The method of claim 1 wherein said curing in step (d.) is carried out for about 30 minutes.

4. The method of claim 1 wherein said dipping step (b.) is carried out for a time sufficient to deposit a film of said latex about 0.004–0.012 inch on said form.

5. The method of claim 1 wherein said coagulant solution comprises a solution of calcium nitrate.

6. The method of claim 1 wherein said latex rubber fluid comprises natural latex fluid.

7. An article manufactured in accordance with the process of claim 1.